May 4, 1971     H. O. CORBETT     3,577,507
TUFTING PROCESS FOR FOAMED PLASTIC STRUCTURES
Filed Jan. 3, 1967     2 Sheets-Sheet 1
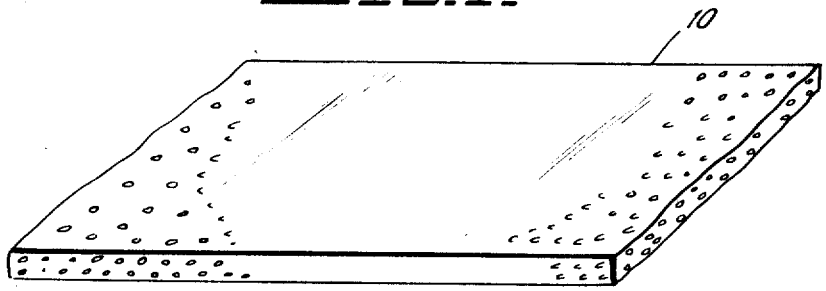
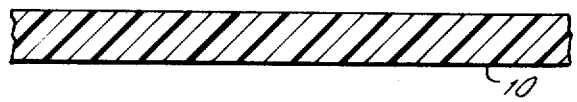
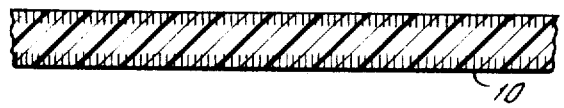
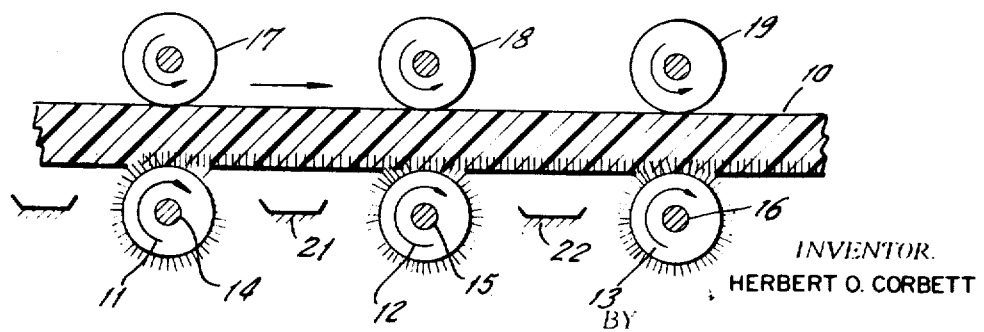
INVENTOR.
HERBERT O. CORBETT

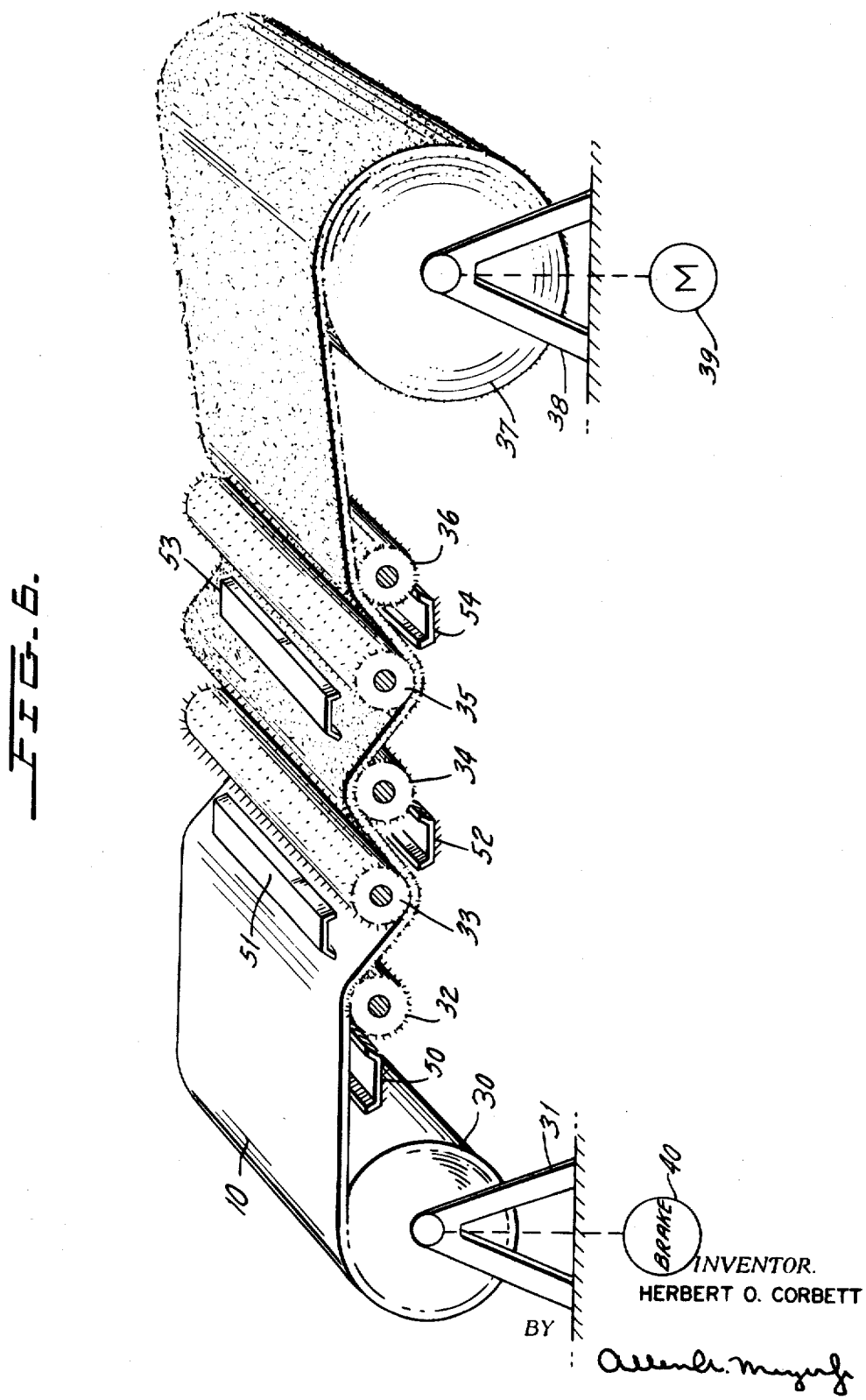

United States Patent Office 3,577,507
Patented May 4, 1971

3,577,507
TUFTING PROCESS FOR FOAMED PLASTIC
STRUCTURES
Herbert O. Corbett, Bridgeport, Conn., assignor to
National Distillers and Chemical Corporation, New
York, N.Y.
Filed Jan. 3, 1967, Ser. No. 606,802
Int. Cl. B26d 3/00
U.S. Cl. 264—321                                       3 Claims

ABSTRACT OF THE DISCLOSURE

A tufted product such as a blanket or rug or other material having a rug or blanket like structure is formed by shredding the outer surface of an elongated foamed plastic sheet. In the shredding process, the foamed plastic sheet is carried over rolls having wire bristles extending from their surface which stab into the surface of the foamed sheet and shred the surface to produce the effect of a tufted or napped surface. Both sides of the foamed sheet are tufted by threading the sheet above and below sequentially arranged wire bristle rollers.

This invention relates to a novel process for the formation of tufted or napped large area sheets for use as blankets or rugs or the like, and more specifically relates to a novel process for shredding at least one surface of a foamed plastic sheet to raise a tuft or nap type surface on the sheet.

In the manufacture of flexible tufted products, such as blankets or rugs, a fabric formed in any well known manner is passed through napping or tufting machines which consist of a series of driven rollers each having a large number of wire bristles extending from its surface. These rollers are rotated to cause their bristles to move back and forth over the surfaces of the base fabric, and in gentle contact with the fabric surface to tear loose the ends of the yarn or thread repeatedly to create tufts or naps. This is understandably a slow process which causes a high manufacturing cost.

Plastic materials have been incorporated into tuft type products where, however, plastics or other synthetics are used in the base block of the product.

The present invention provides a novel process for forming a novel article wherein a sheet of foamed plastic material, which could be continuously produced by well known extrusion processes, has one or both of its surfaces shredded by passing the article through a shredder consisting of rolls having the rigid thin bristles extending therefrom. The engagement of the bristles with the surface of the foamed sheet will cause a shredding of the foamed sheet surface, thereby to raise the effect of a tuft or nap of the foamed sheet product so that it can be subsequently used as a blanket or rug or other similar fabric. It is useful to slightly raise the temperature of the plastic to some temperature lower than its melting point to assist in the abrasion action of the bristles on the foamed sheet surface.

Accordingly a primary object of this invention is to provide a novel process for the manufacture of tufted type articles.

Another object of this invention is to provide a process for the manufacture of an inexpensive tufted type sheet.

Another object of this invention is to provide a novel process for forming a tufted article of a continuously extruded sheet material.

A still further object of this invention is to shred the surface of a relatively stiff sheet of plastic material to convert the sheet into a relatively flexible body having a tufted or napped type exterior surface.

These and other objects of this invention will become apparent from the following description when taken in connection with the drawings, in which:

FIG. 1 is a perspective view of a partial length of a sheet of extruded foamed plastic material.

FIG. 2 is a cross-sectional view of the foamed material of FIG. 1.

FIG. 3 illustrates the shredding of the bottom surface of the sheet of FIG. 2 to form a tufted type material useful, for example, as a rug.

FIG. 4 is a cross-sectional view of the sheet material of FIG. 2 shredded on both sides to form a relatively flexible tufted type upper and lower surface which are connected by a central web.

FIG. 5 schematically illustrates the equipment used in forming the single surface tuft of FIG. 3.

FIG. 6 is a perspective diagram of a tufting type apparatus for shredding the opposite surfaces of an elongated web of plastic material.

Referring first to FIG. 1, there is illustrated therein a typical plastic web 10 which is of foamed plastic composed, for example, of any desired carrier plastic material containing from 1 to 10% Azodicarbomide or from 1 to 10% of the Azobisformamide.

This material is produced by a continuous extrusion process well known to those skilled in the art, and may be extruded to any desired thickness and width simultaneously. The sheet may be stretched longitudinally and laterally as it is extruded with the material thereafter cooled and wound into industrially acceptable standard lengths and widths. This foamed material may be extruded in varying densities for example, from 2 to 30 pounds per cubic foot depending upon its subsequent application.

In accordance with the invention, the material which will normally have smooth opposite surfaces, as shown in FIG. 2, may be shredded on one surface as illustrated in FIG. 3, or on both surfaces, as illustrated in FIG. 4, to raise a nap type surface.

By way of example, the sheet of FIG. 2 may have an extruded thickness of 15 mils which is shredded on one or both surfaces to a depth of about 5 mils to raise a nap height of about 10 mils.

In the embodiment of FIG. 3, therefore, the original 15 mil thickness will be increased to 20 mils with the solid web having a thickness of 10 mils with a nap height of 10 mils. In the case of the blanket type structure of FIG. 4, the nap height on each side will be 10 mils with the central web having a thickness of 5 mils.

In order to obtain the structure of FIG. 3 and in accordance with the invention, the web of FIG. 2 is passed through a plurality of shredding rolls 11, 12 and 13 which are rotatably supported on suitable pivotal supports 14, 15 and 16 respectively. Each of rolls 11, 12 and 13 have lengths which are at least co-extensive with the width of film 10 and are backed up by smooth backing rollers 17, 18 and 19 respectively. As web 10, which moves from left to right, initially passes across roll 11, wire bristles extending from roll 11 puncture the web surface and during the rotation of the roll, as the web 10 moves to the right, tear out of the surface thereby causing an initial shredding action upon the surface. As this shredded area of the roll reaches the next roll 12, it is shredded again so that a deeper nap is formed. A still deeper nap is formed by the subsequent shredding action of roll 13 having the wire bristles cutting into the previously shredded surface portions of web 10 and further causing additional shredding.

In order to raise a pile or nap of approximately 10 mils, the wire bristles extending from the rolls 11 through 13 should have a length of about 10 mils. The wire bristles used are fixed to the roll surfaces of rolls 11, 12 and 13 and have diameters of about 0.5 mil and a density of about 1,000 wires per square inch. It is useful to graduate the lengths of the wires from rolls 11 through 13 so that shorter wires are used on roll 11 than on the subsequent rolls so that a more gradual shredding action can be obtained. While any desired number of rolls can be used, good results can be obtained with at least 5 rolls, 3 of which are shown in FIG. 3.

The results can also be improved by the addition of heater means schematically illustrated in FIG. 5 as infrared heaters 20, 21 and 22 which extend across the full width of the web and preheat the web before it enters a shredding state. This preheating is not critical and should be less than the melting point of the plastic web 10.

FIG. 6 illustrates the apparatus used for shredding the opposite surfaces of web 10 to obtain a product of the type illustrated in FIG. 4. In FIG. 6, the web 10 is stored in a roll 30 which is carried in a suitable support 31. The web is then threaded over and under a series of wire bristle rolls 32 through 36 wherein at least 5 rolls would be provided above the web and at least 5 would be provided below the web for shredding the respective surfaces of the web 10. A shredding action of the surface of web 10 will then proceed in the manner described for FIG. 5 with the shredded web subsequently rolled into a storage roll 33 carried on stand 38. A suitable motor 39 is connected to roll 37 to continuously draw web 10 through the shredding rolls 32 through 36 and to unroll roll 30. Suitable tension may be obtained on the web 10 by the use of a light tension brake 40 connected to supply roll 30.

Note that in the embodiment of FIGS. 5 and 6 that the wire bristles are freely rotatable and do not shred the web by scoring, but rather shred the web by puncturing and tearing out as the rolls roll with respect to the web. If desired, however, a limited scoring action can be obtained by placing some braking action on the rolls so that they do not rotate sufficiently fast to match the speed of the web as it moves past the rolls. Again the lengths of the wire bristles of rolls 32 through 36 may be gradually increased to improve the shredding action with the pile becoming progressively higher as the web passes through the various shredding rolls.

Suitable heating sources 50, 51, 52, 53 and 54 may also be located in front of each shredding roll to raise the plastic temperature, and improve the shredding action of the respective wire rolls.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. The process of forming an elongated article having a tufted like surface, said process comprising the steps of sequentially passing at least one surface of a foamed thermoplastic sheet over a plurality of rotatable rollers having shredding bristles extending therefrom, the lengths of said shredding bristles of said plurality of rollers increasing to sequentially shred deeper into said surface as said surface moves over said plurality of rollers, and sequentially shredding the said surface by rolling said surface over said bristles.

2. The process of forming an elongated article having a tufted like surface; said process comprising the steps of sequentially passing a foamed thermoplastic sheet over and under a plurality of rotatable rollers having shredding bristles extending therefrom, and sequentially shredding the opposite surfaces of said sheet by rolling said opposite surfaces over alternate rollers of said plurality of rollers, the lengths of said shredding bristles of said plurality of rollers increasing to sequentially shred deeper into said surface as said surface moves over said plurality of rollers.

3. The process of claim 2 which includes the preheating of said surface before said surface engages any of said rollers.

References Cited

UNITED STATES PATENTS

| 3,041,193 | 6/1962 | Hamway et al. | 117—11 |
| 3,191,258 | 6/1965 | Spencer | 117—11X |
| 3,284,274 | 11/1966 | Hulslander et al. | 161—159 |
| 3,429,727 | 2/1969 | Hochberg | 117—11 |
| 3,399,425 | 9/1968 | Lemelson | 18—10 |

WILLIAM A. POWELL, Primary Examiner

U.S. Cl. X.R.

83—2; 161—62, 164